(12) United States Patent
Okubo et al.

(10) Patent No.: US 9,238,458 B2
(45) Date of Patent: Jan. 19, 2016

(54) HYBRID-ELECTRIC VEHICLE ENGINE STARTING METHOD AND SYSTEM

(71) Applicant: FORD GLOBAL TECHNOLOGIES, LLC, Dearborn, MI (US)

(72) Inventors: Shunsuke Okubo, Belleville, MI (US); Jonathan Andrew Butcher, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/010,618

(22) Filed: Aug. 27, 2013

(65) Prior Publication Data

US 2014/0277881 A1 Sep. 18, 2014

Related U.S. Application Data

(60) Provisional application No. 61/799,103, filed on Mar. 15, 2013.

(51) Int. Cl.
| | |
|---|---|
| *B60L 9/00* | (2006.01) |
| *B60L 11/00* | (2006.01) |
| *G05D 1/00* | (2006.01) |
| *G06F 7/00* | (2006.01) |
| *G05D 3/00* | (2006.01) |
| *G06F 17/00* | (2006.01) |
| *B60W 20/00* | (2006.01) |
| *B60W 10/06* | (2006.01) |
| *B60W 10/08* | (2006.01) |
| *F02N 11/08* | (2006.01) |
| *B60W 50/038* | (2012.01) |
| *F02D 41/22* | (2006.01) |
| *B60K 6/48* | (2007.10) |

(52) U.S. Cl.
CPC .............. *B60W 20/00* (2013.01); *B60W 10/06* (2013.01); *B60W 10/08* (2013.01); *B60W 20/40* (2013.01); *B60W 20/50* (2013.01); *B60W 50/038* (2013.01); *F02N 11/08* (2013.01); *B60K 2006/4825* (2013.01); *B60W 2510/0638* (2013.01); *B60W 2510/0676* (2013.01); *B60W 2710/0666* (2013.01); *B60W 2710/0672* (2013.01); *F02D 41/22* (2013.01); *F02N 11/0814* (2013.01); *F02N 2200/022* (2013.01); *F02N 2200/023* (2013.01); *F02N 2300/104* (2013.01); *Y10S 903/905* (2013.01)

(58) Field of Classification Search
CPC ... B60K 6/445; Y02T 10/6286; B60W 10/06; B60W 10/08; B60W 20/00
USPC .......................................................... 701/22
See application file for complete search history.

(56) References Cited

U.S. PATENT DOCUMENTS

| | | | |
|---|---|---|---|
| 5,633,458 A | 5/1997 | Pauli et al. | |
| 7,412,954 B2 * | 8/2008 | Shiino et al. | 123/179.16 |
| 7,678,013 B2 | 3/2010 | Soliman et al. | |
| 7,996,145 B2 * | 8/2011 | Snyder | 701/104 |

* cited by examiner

*Primary Examiner* — Maceeh Anwar
(74) *Attorney, Agent, or Firm* — David B. Kelley; Brooks Kushman P.C.

(57) ABSTRACT

A system or method for controlling an engine in a hybrid vehicle include cranking the engine subject to a first torque limit in response to an engine start request, receiving an engine rotational position signal, and cranking the engine subject to a second torque limit in response to the engine rotational position signal indicating a number of engine revolutions being less than a threshold value.

20 Claims, 5 Drawing Sheets

HYBRID-ELECTRIC VEHICLE ENGINE STARTING METHOD AND SYSTEM

CROSS-REFERENCE TO RELATED APPLICATIONS

This application claims the benefit of U.S. Provisional Application Ser. No. 61/799,103 filed Mar. 15, 2013, the disclosure of which is hereby incorporated in its entirety by reference herein.

TECHNICAL FIELD

The present disclosure relates to a method and system for starting a hybrid-electric vehicle engine.

BACKGROUND

Hybrid electric vehicles (HEVs) utilize a combination of an internal combustion engine with an electric machine to provide the power needed to propel a vehicle. This arrangement provides improved fuel economy over conventional vehicles that possess only an internal combustion engine. An HEV may improve fuel economy by shutting down the engine during times that the engine operates inefficiently or is not otherwise needed to propel the vehicle. This may occur, for example, when the vehicle stops at traffic signals, stop signs, or when the electric machine is able to provide sufficient power to propel the vehicle without use of the engine. In these situations, the internal combustion engine is shutdown and the battery and electric machine provide power to propel the vehicle.

If additional power is requested or needed by the vehicle, the internal combustion engine is restarted using various methods. Such methods include a traditional starter motor or electric machine rotating the engine and firing the engine when the engine rotational speed exceeds a threshold value. These traditional engine start/restart methods may result in damage to the engine or transmission in the cases where the engine or transmission do not freely rotate, such as when the engine is hydrolocked, for example. As such, it is desirable to alter the engine restart strategy or avoid restarting the engine.

SUMMARY

In one embodiment, a system and method are provided for starting an engine of a hybrid vehicle having an electric machine. An engine cranking torque, subject to a first engine cranking torque limit, is applied to the engine for a first predetermined period of time. Another engine cranking torque, subject to a second engine cranking torque limit, is applied to the engine if a number of engine revolutions within the first predetermined period of time is at least a threshold value.

In another embodiment, a method is provided for controlling an engine start/restart. A first engine cranking torque limit signal is sent to a controller in response to at least one of a temperature signal and an engine start request. The controller then receives a signal indicative of a number of engine revolutions and a second engine cranking torque limit signal is sent to the controller in response to the signal indicative of a number of engine revolutions less than a threshold value.

In yet another embodiment, a hybrid electric vehicle is provided with a controller connected to an internal combustion engine and a control module. The controller is configured to output a first engine cranking torque limit signal to the control module, in response to at least one of a temperature signal and an engine start request. The control then receives a signal indicative of a number of engine revolutions and outputs a second engine cranking torque limit signal in response to the signal indicative of a number of engine revolutions being less than a threshold value.

Embodiments according to the present disclosure provide various advantages. For example, various embodiments prevent possible damage to the engine upon restart by attempting to rotate the engine at a lower torque than applied when starting the engine with speed control. Use of a lower torque to rotate the engine may enable the system to verify engine and/or powertrain rotation prior to attempting a full-torque engine start. A diagnostic code may be stored and/or an indicator provided to alert a driver of the operating condition.

The above advantages and other advantages and features will be readily apparent from the following detailed description of the preferred embodiments when taken in connection with the accompanying drawings.

DETAILED DESCRIPTION

As required, detailed embodiments are described herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments of the disclosure.

Hybrid electric vehicles sometimes referred to as start/stop vehicles may improve fuel economy by shutting down the engine during times that the engine operates inefficiently or is not otherwise needed to propel the vehicle. In these situations, the internal combustion engine is shutdown and an electric machine through use of a battery provides power to propel the vehicle. As power is needed or requested by the vehicle, the engine is restarted. In some circumstances the engine or transaxle may not freely rotate, such as a hydrolocked or seized engine or broken components within the engine or transaxle. Engine start attempts in these situations may lead to engine damage or transmission damage, or exacerbate existing damage. For example, attempting an engine start using available torque from an electric machine may result in deformed connecting rods or pistons, damage to engine and transmission mating splines or other powertrain components. According to the present disclosure, damage to the engine or transmission may be avoided by controlling the engine cranking torque applied to the engine by the motor until it can be confirmed that the crankshaft is rotating and is not hydrolocked, seized, or in a damaged condition.

Figure 1:
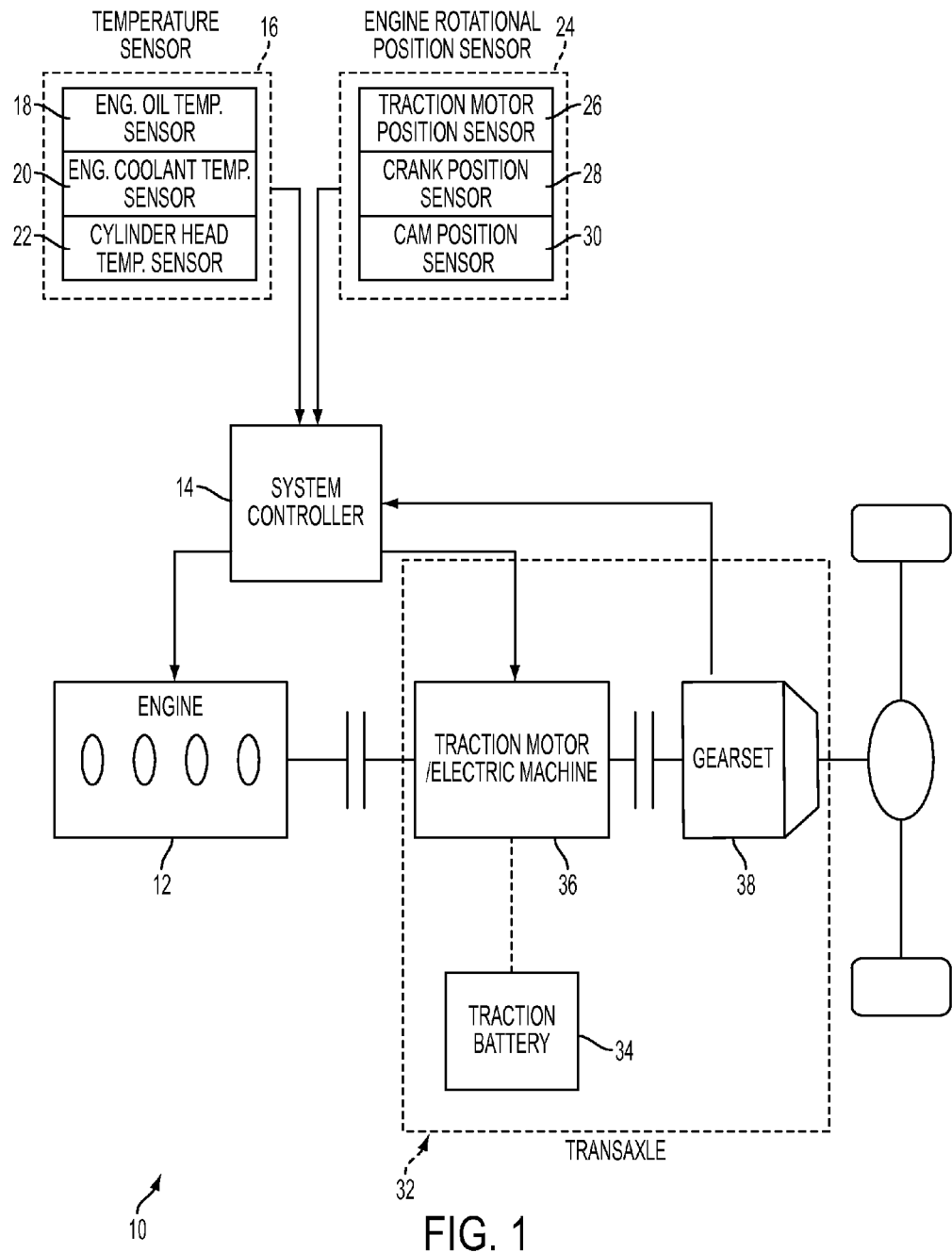
FIG. 1 is a schematic representation of a vehicle system according to embodiments of the present disclosure.

Referring to FIG. 1, a schematic representation of a vehicle 10 according to embodiments of the present disclosure is shown. Those of ordinary skill in the art will recognize that embodiments of the present disclosure can be used in powertrains other than configurations as illustrated in FIG. 1 where an electric machine has sufficient available torque to damage the engine if the engine does not freely rotate. The vehicle shown in FIG. 1 includes an engine 12 coupled to a transaxle 32 provided with a traction battery 34, a traction motor (electric machine) 36 and gear set 38. A system controller 14 is in communication with the engine 12 and components of the transaxle 32. The system controller 14 is sometimes referred to as an engine control module (ECM), powertrain control module (PCM) or vehicle systems controller (VSC), for example, and generally includes a microprocessor in communication with computer readable storage media, represented by RAM 126 and KAM 128. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the microprocessor to directly or indirectly control the transaxle 32 and/or engine 12. Alternatively, engine 12 and the combination of the electric machine 36 and the gear set 38 may have separately provided controllers, for example, an engine control module (ECM) and a transaxle control module (TCM) in communication with each other.

The controller 14 determines the need for an engine start based on various factors, including driver inputs, system power needs and requests from other components within the vehicle. The controller 14 may also receive or generate an engine start request. Once the need to start the engine 12 is identified, the controller 14 may issue a command to the motor 36 to apply sufficient torque up to the maximum available motor torque in a feedback controller to meet an engine speed target or engine torque target. Such starting method is commonly referred to as speed control. The torque applied by the electric machine 36 to the engine 12 is commonly referred to as engine cranking torque. Alternatively, a traditional starter may be used to apply engine cranking torque to the engine 12.

The controller 14 is in communication with a temperature sensor 16 that may provide a representative temperature of the engine. The temperature sensor may be an engine oil temperature sensor 18, an engine coolant temperature sensor 20, a cylinder head temperature sensor 22, or a combination of these sensors or other temperature sensors. Engine cranking torque requirements tend to increase with decreasing temperature, due to the increased viscosity of engine oil in colder temperatures. The controller 14 receives a temperature signal and is able to adjust the engine cranking torque applied to the engine 12, or set a corresponding engine torque cranking limit, based on the temperature signal. The controller is in communication with an engine rotational position sensor 24. The rotational position sensor may be implemented by a traction motor position sensor (resolver) 26, an engine crankshaft position sensor (hall effect or variable reluctance sensor) 28, a cam position sensor, or a combination of these sensors or other sensor capable of determining the engine rotational position or speed. The controller 14 is configured to count the number of engine revolutions through use of the engine rotational position sensor 24.

Figure 2:
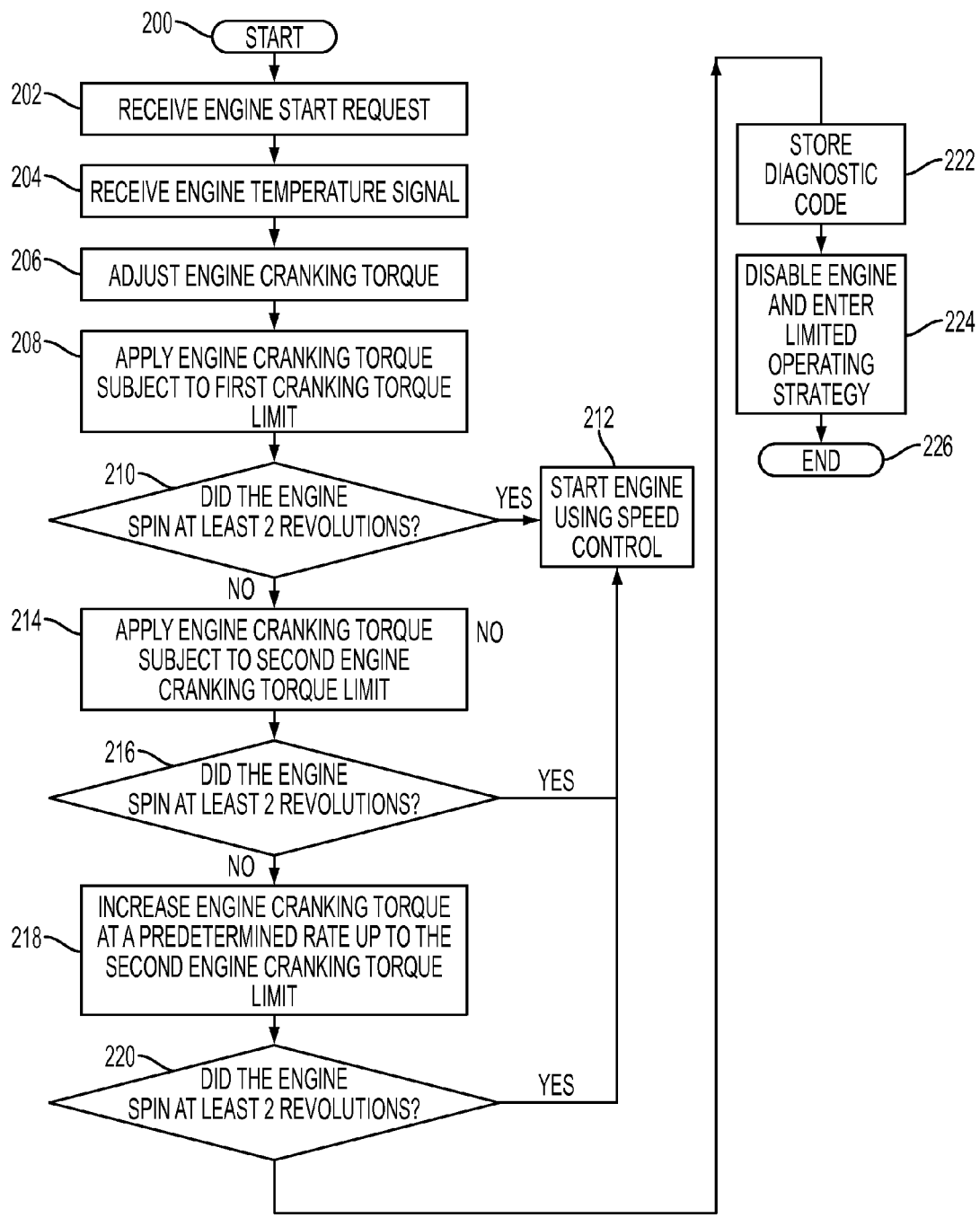
FIG. 2 is a block diagram illustrating operation of a representative embodiment of a method according to the present disclosure.

Referring to FIG. 2, a system and method for starting a hybrid-electric vehicle engine according to an exemplary embodiment of the present disclosure is shown. The various functions may be performed in an order or sequence other than illustrated in FIG. 2 depending upon the particular processing strategy, such as event-driven, interrupt-driven, etc. Similarly, one or more steps or functions may be repeatedly performed, performed in parallel, and/or omitted under particular operating conditions or in particular applications, although not explicitly illustrated. In one embodiment, the functions illustrated are primarily implemented by software, instructions, or code stored in a computer readable storage device and executed by one or more microprocessor-based computers or controllers to control operation of the vehicle.

More specifically, in FIG. 2, a controller initiates the engine start as shown in block 200. The controller receives an engine start request, block 202, and receives an engine temperature signal, block 204. The controller may adjust an applied engine cranking torque value and/or engine cranking torque limit based on the engine temperature signal received, block 206. The controller commands application of engine cranking torque subject to a first engine cranking torque limit, block 208. If the controller counts at least two revolutions of the engine within a predetermined time period, block 210, the controller commands an engine start using speed control, block 212, and removes the engine cranking torque limits. If the controller counts less than two revolutions within a predetermined time period, block 210, the controller commands application of engine cranking torque subject to a second engine cranking torque limit, block 214. This engine cranking torque subject to a second engine cranking torque limit may be a higher engine cranking torque than the engine cranking torque subject to a first engine cranking torque limit. If the controller counts at least two revolutions of the engine within a predetermined time period, block 216, the controller commands an engine start using speed control, block 212. If the controller counts less than two engine revolutions of the engine within a predetermined time period, block 216, the controller commands an increase in the engine cranking torque at a predetermined rate up to the second engine cranking torque limit, block 218. If the controller counts at least two revolutions of the engine within the predetermined time period, block 220, the controller commands an engine start using speed control, block 212. If the controller counts less than two engine revolutions within the predetermined time period, block 220, the controller stores a diagnostic code, block 222, disables the engine, and enters a limited operating strategy, block 224.

The diagnostic code stored in block 222 generally indicates that engine rotation, if any, is requiring more torque than expected, which may occur if the engine has seized or hydrolocked, for example. The driver of the vehicle may also be alerted/notified with a corresponding light, sound, or message. The limited operating strategy initiated in block 224 permits the vehicle to continue operation without the use of the engine and the driver is notified of the vehicle being in limited operating strategy.

Figure 3:
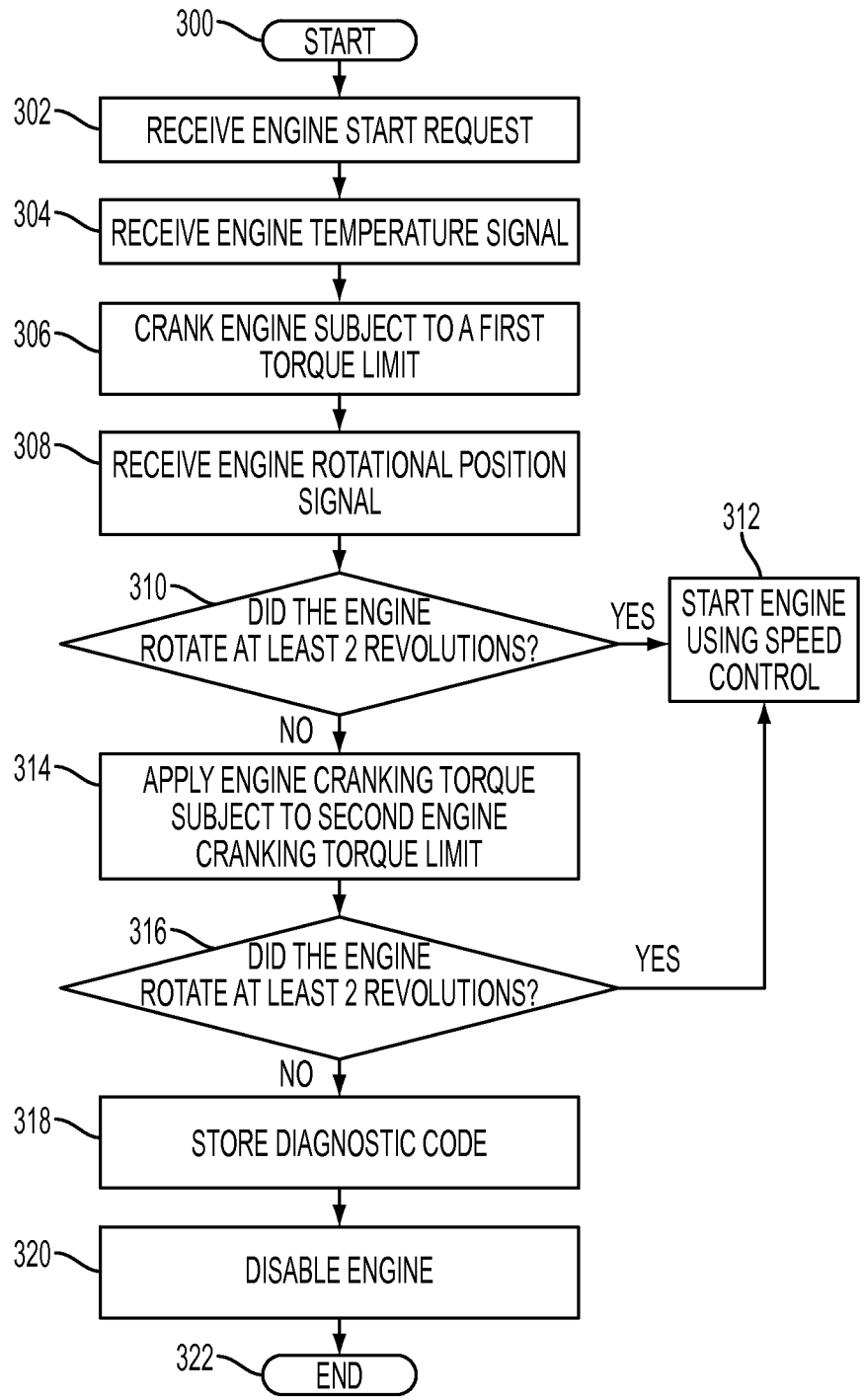
FIG. 3 is a flowchart illustrating operation of a representative embodiment of a system or method according to the present disclosure.

Referring to FIG. 3, a system and method for starting a hybrid-electric vehicle engine according to an exemplary embodiment of the present disclosure is shown. The various functions may be performed in an order or sequence other than illustrated in FIG. 3 depending upon the particular processing strategy, such as event-driven, interrupt-driven, etc. Similarly, one or more steps or functions may be repeatedly performed, performed in parallel, and/or omitted under particular operating conditions or in particular applications, although not explicitly illustrated. In one embodiment, the functions illustrated are primarily implemented by software, instructions, or code stored in a computer readable storage device and executed by one or more microprocessor-based computers or controllers to control operation of the vehicle.

More specifically, in FIG. 3, a controller initiates the engine start as shown in block 300. The controller receives an engine start request, block 302, and receives an engine temperature signal, block 304. The controller may adjust an applied engine cranking torque value and engine cranking torque limit based on the engine temperature signal received. The controller commands cranking of the engine subject to a first engine cranking torque limit, block 306. The controller receives an engine rotational position signal, block 308. If the controller counts at least two revolutions of the engine within a predetermined time period, block 310, the controller commands an engine start using speed control, block 312. Should the controller count fewer than two revolutions of the engine within a predetermined time period, block 310, the controller commands cranking of the engine subject to a second engine cranking torque limit, block 314. If the controller counts at least two revolutions of the engine within a predetermined time period, block 316, the controller commands an engine start using speed control, block 312. Should the controller count fewer than two revolutions of the engine within a predetermined time period, block 316, the controller stores a diagnostic code, block 318, and disables the engine, block 320. The controller then ends the sequences, block 322. The diagnostic code stored in block 318, indicates a possible fault or seized or hydrolocked engine and the driver of the vehicle may be alerted/notified.

Figure 4:
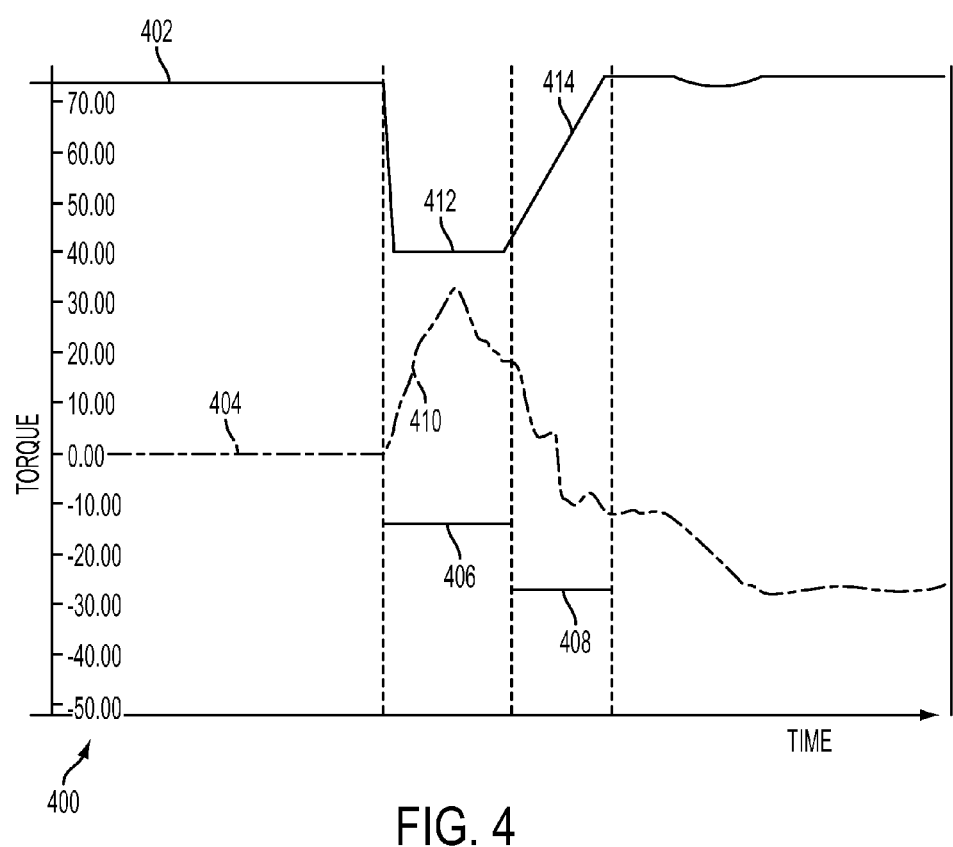
FIG. 4 is a graph illustrating operation of a representative embodiment of a system or method according to the present disclosure.

Referring now to FIG. 4, a plot of engine cranking torque versus time 400 according to a method of starting an engine is shown. The variables plotted in FIG. 4 are characteristic of the method of starting an engine. The controller applies an engine cranking torque limit 402 and the electric machine applies an engine cranking torque 404 to the engine. An engine cranking torque 410 is applied to the engine subject to a first engine cranking torque limit 412, during a predetermined time period 406. In FIG. 4, the engine was able to complete at least two revolutions within the first time period 406. The engine cranking torque limit is removed, 414 during a time period 408 and the engine is started. Plot 400 demonstrates an engine absent a fault or hydrolock and able to complete two revolutions in accordance with the present disclosure.

Figure 5:
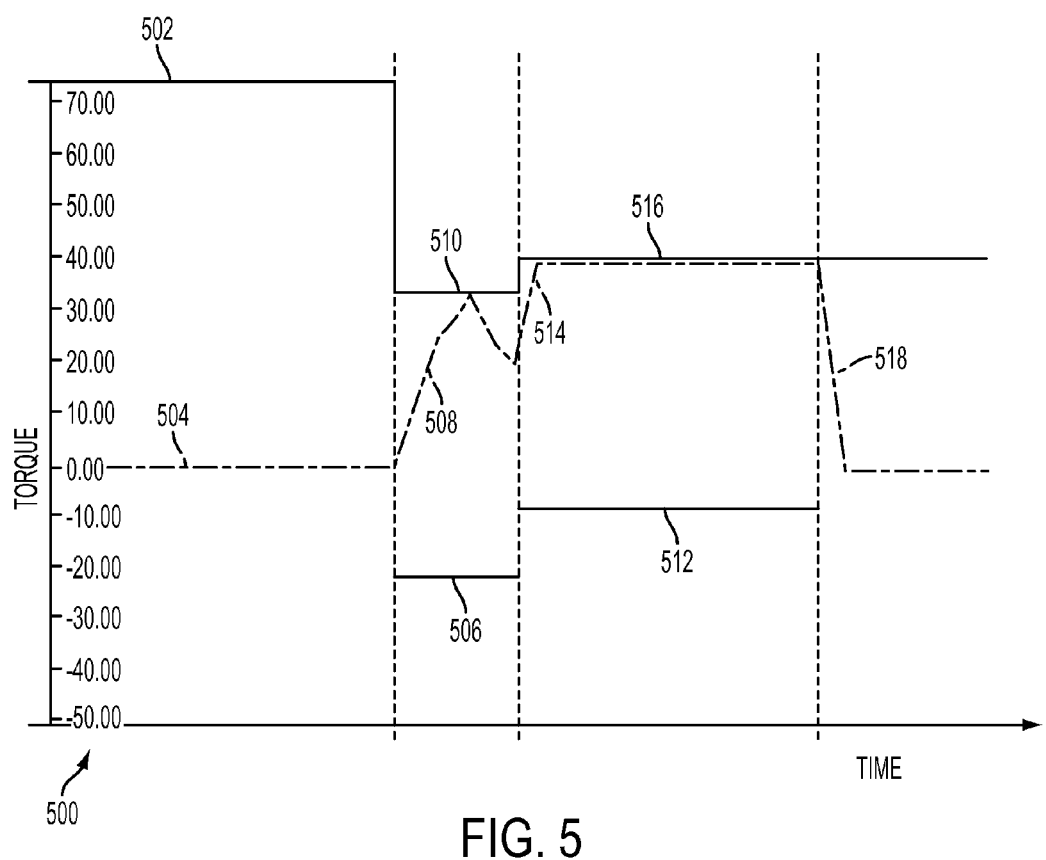
FIG. 5 is a graph illustrating operation of a representative embodiment of a system or method according to the present disclosure.

Referring now to FIG. 5, a plot of engine cranking torque versus time 500 according to a method of starting an engine is shown. The controller applies an engine cranking torque limit 502 and the engine cranking torque 504 is applied to the engine. During a first time period 506, an engine cranking torque 508 is applied to the engine, subject to a first engine cranking torque limit 510. In FIG. 5, the engine completed fewer than two engine revolutions within the first time period 506. An engine cranking torque 514 is applied to the engine subject to a second engine cranking torque limit 516, which may be higher than the first engine cranking torque limit. The engine cranking torque 514 applied to the engine is increased at a predetermined rate up to the second engine cranking torque limit 516 during a second time period 512. The engine completed fewer than two engine revolutions during the second time period 512. The controller then stops cranking the engine by removing the engine cranking torque 518.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed is:

1. A method for starting an engine comprising:
    applying an engine cranking torque subject to a first engine cranking torque limit for a first predetermined period of time; and
    applying an engine cranking torque subject to a second engine cranking torque limit higher than the first engine cranking torque limit if a number of engine revolutions within the first predetermined period of time is less than a threshold value.

2. The method of claim 1, further comprising:
    increasing the engine cranking torque at a predetermined rate up to the second engine cranking torque limit for a second predetermined period of time if the number of engine revolutions measured within the first predetermined period of time is less than the threshold value.

3. The method of claim 2, further comprising:
    storing a diagnostic code if the number of engine revolutions measured within the second predetermined period of time is less than a threshold value.

4. The method of claim 3, further comprising:
    disabling the engine and entering a limited operating strategy if the number of engine revolutions measured within the second predetermined period of time is less than the threshold value.

5. The method of claim 1, further comprising:
    adjusting at least one of the first engine cranking torque limit and the second engine cranking torque limit in response to a temperature signal.

6. A method for controlling an engine, comprising:
    cranking the engine subject to a first torque limit based on a temperature signal in response to an engine start request;
    receiving an engine rotational position signal; and
    cranking the engine subject to a second torque limit in response to the engine rotational position signal indicating a number of engine revolutions being less than a threshold value.

7. The method of claim 6, further comprising:
    starting the engine using engine speed control in response to the engine rotational position signal indicating the number of engine revolutions exceeding the threshold value.

8. The method of claim 7, further comprising:
    storing a diagnostic code in response to the engine rotational position signal indicating the number of engine revolutions being less than a threshold value.

9. The method of claim 7, further comprising:
    disabling the engine from starting in response to the engine rotational position signal indicating the number of engine revolutions exceeding the threshold value.

10. A hybrid vehicle comprising:
a controller connected to an engine and configured to:
crank the engine subject to a first torque limit based on a temperature signal, in response to an engine start request;
receive an engine rotational position signal; and
crank the engine subject to a second torque limit in response to the engine rotational position signal indicating a number of engine revolutions less than a threshold value.

11. The hybrid vehicle of claim 10, wherein the controller is further configured to transmit a signal to start the engine using speed control in response to the engine rotational position signal indicating the number of engine revolutions equal to or greater than the threshold value.

12. The hybrid vehicle of claim 11, wherein the controller is further configured to store a diagnostic code in response to the engine rotational position signal indicating the number of engine revolutions being less than the threshold value.

13. The hybrid vehicle of claim 11, wherein the controller is further configured to transmit a signal to disable the engine from starting in response to the engine rotational position signal indicating the number of engine revolutions being less than the threshold value.

14. The hybrid vehicle of claim 11, wherein the engine rotational position signal is generated by a crankshaft position sensor.

15. The hybrid vehicle of claim 11, wherein the engine rotational position signal is generated by a traction motor position sensor.

16. The hybrid vehicle of claim 11, wherein the temperature signal is generated by an engine oil temperature sensor.

17. The hybrid vehicle of claim 10 wherein the controller is configured to increase the engine cranking torque at a predetermined rate up to the second torque limit if the number of engine revolutions is less than the threshold value after a predetermined period of time.

18. The hybrid vehicle of claim 10 further comprising an electric machine selectively operable as a traction motor or generator coupled to the engine, wherein the second torque limit corresponds to a maximum electric machine torque.

19. The hybrid vehicle of claim 10 wherein the controller is further configured to disable the engine and enter a limited operating strategy using a traction battery if the number of engine revolutions measured within a predetermined period of time is less than the threshold value.

20. The hybrid vehicle of claim 10 further comprising an electric machine selectively operable as a traction motor or a generator coupled to the engine, wherein the controller is configured to crank the engine using the traction motor.

* * * * *